No. 657,879. Patented Sept. 11, 1900.
D. C. LINGENFELTER.
PITMAN CONNECTION.
(Application filed June 26, 1900.)

(No Model.)

WITNESSES:
Jos. A. Ryan
Amos W. Hart

INVENTOR
D. C. Lingenfelter
BY Munn & Co.
ATTORNEYS

UNITED STATES PATENT OFFICE.

DAVID C. LINGENFELTER, OF PLAINVIEW, NEBRASKA.

PITMAN CONNECTION.

SPECIFICATION forming part of Letters Patent No. 657,879, dated September 11, 1900.

Application filed June 26, 1900. Serial No. 21,604. (No model.)

*To all whom it may concern:*

Be it known that I, DAVID C. LINGENFELTER, residing at Plainview, in the county of Pierce and State of Nebraska, have invented a new and useful Improvement in Pitman Connections for Mowing-Machines, of which the following is a specification.

The bearings of pitmen of mowing-machines are subjected to much friction and soon become worn so much that the parts must be readjusted to prevent the lost motion that commonly occurs. For this purpose various expedients have been resorted to, but, so far as I am aware, without the entire success desired. I have devised and subjected to practical test an improvement which meets every requirement in operation, admits of easy adjustment, and involves very slight cost additional to that of the ordinary bearings. The details of construction and operation of the same are as hereinafter described.

Figure 1:
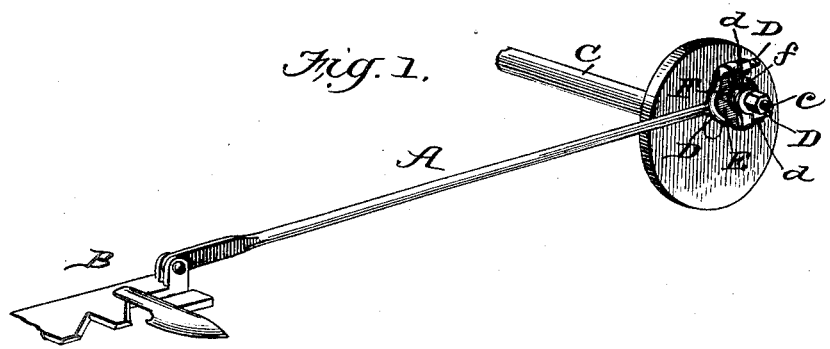
Figure 2:
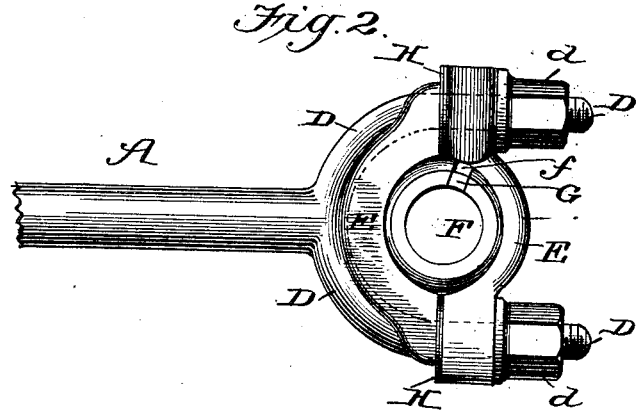
Figures 3, 4, 5:
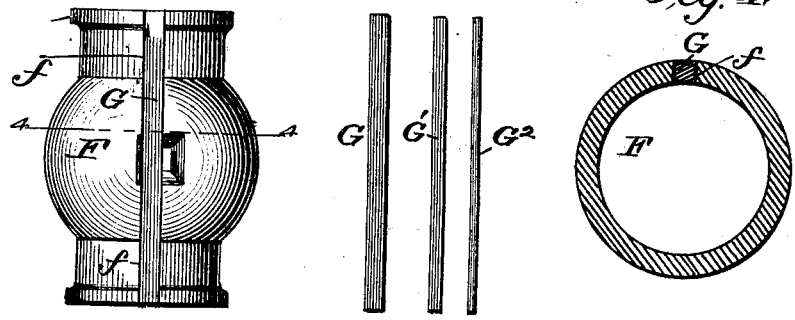

In the accompanying drawings, Figure 1 is a perspective view showing my invention as in use. Fig. 2 is an enlarged side view of a pitman-head provided with my improved bushing. Fig. 3 is an enlarged plan view of the bushing. Fig. 4 is a cross-section of the bushing, and Fig. 5 shows a series of graduated keys.

The pitman A connects the reciprocating cutter B of a mowing-machine with the wrist-pin $c$ of its crank-shaft C. Its head D is forked and adapted to receive two boxes E, that are clamped in the usual way by two nuts or burs $d$ upon the bushing F, through which the wrist-pin $c$ passes. The said bushing F thus constitutes the bearing proper and is the part subject to wear, together with the wrist-pin. The bushing has a circumferential swell, and the parts of the surrounding bearing have a like concavity to receive said swell, whereby the bushing is prevented from lateral displacement. To enable it to be adjusted—*i. e.*, reduced or contracted in diameter as required to compensate for wear, and thus prevent lost motion—I adopt the following-described construction and combination of parts:

To enable the bushing F to be compressed and contracted, so as to fit the wrist-pin $c$, I provide it with an open lengthwise slot $f$. This is formed by sawing twice through the bushing, whereby a strip of the required width is removed—that is to say, the width of such strip must equal or exceed the degree of circumferential contraction which will possibly be required to enable the bushing F to take up wear so long as it may remain in use. The strip thus removed leaves a space or gap in the bushing which must be closed in such manner as to form a smooth continuation of the interior or friction surface of the bushing. I have devised and employ a series of filling pieces or keys G G' G², (see Fig. 4,) which are of progressively-decreasing widths corresponding to the different adjustments—*i.e.*,contractions—of the bushing F required as wear progresses—that is to say, when the bushing F is first applied to the wrist-pin $c$ a filling piece or key G of maximum width or thickness is inserted in the slot $f$, as shown in Fig. 2. When the wear has become sufficient to require contraction of the bushing, the first key G is removed, the one G' next to it in width is inserted in its place, and the nuts $d$ again screwed down to clamp the boxes E together upon the bushing F and its key. When the wear has further progressed, a key G² of less width is inserted. Thus keys of graduated widths are successively inserted as wear increases. In every case the key not only prevents the adjacent edges of the bushing F from being brought too near each other, so that the bushing cannot be clamped too tightly upon the wrist-pin $c$, but it forms also virtually a continuation of the smooth friction-surface required for the interior of the bushing, thereby performing two functions simultaneously.

Corresponding to the different-sized keys a series of washers H may be employed between the boxes E of the pitman-bearing, whereby they are separated more widely at first than subsequently. In other words, washers H of varying thicknesses are used as the several contractions of the bushing F are made in order to enable the boxes to bear solidly upon each other. Otherwise the boxes E would require to be separated in the first instance sufficiently to prevent them coming together in any adjustment that may be subsequently made.

Having thus described my invention, what I claim, and desire to secure by Letters Patent, is—

1. The combination with the mower-shaft, wrist-pin, and the pitman-box comprising the fork D, and the movable cap E, of the brass bushing F for such bearing, the same having a circumferential swell and a lengthwise slot, and a key of the required width inserted between the separated edges of the bushing and forming part of a smooth bearing-surface and holding the edges of the bearing a fixed distance apart, as shown and described.

2. The combination with the wrist-pin and pitman having a bearing as described, and means for clamping the movable part of the bearing, of washers inserted between the parts of said bearing, a bushing having a lengthwise slot and one of a series of graduated keys inserted in such slot, as and for the purpose specified.

DAVID C. LINGENFELTER.

Witnesses:
JAMES ELLIS,
JOHN W. ALLEN.